United States Patent Office 3,012,053
Patented Dec. 5, 1961

---

3,012,053
ALKYLENEBIS(THIONOCARBAMATES)
Thomas E. Lesslie, Mount Holly, N.C., assignor to Monsanto Chemical Company, St. Louis, Mo., a corporation of Delaware
No Drawing. Filed Aug. 6, 1958, Ser. No. 753,411
4 Claims. (Cl. 260—455)

The present invention relates to a new class of thionocarbamates valuable for defoliating plants.

The compounds of the present invention possess the structural formula

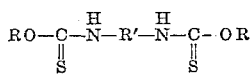

where R represents a lower alkyl or lower alkenyl group, as for example methyl, ethyl, propyl, isopropyl, butyl, isobutyl, tertiary butyl or allyl and R' represents ethylene, trimethylene or propylene.

The new compounds may be prepared by condensing a bis xanthogen sulfide or thioanhydride with an alkylene diamine. For example, 72 grams of ethyl xanthogen disulfide

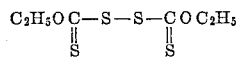

was dissolved in 200 ml. of ether and 18.3 grams of ethylene diamine dissolved in 100 ml. of ether added over a period of about 30 minutes. The by-product was precipitated from the ether solution and removed by filtration. Upon evaporation of the filtrate a good yield of diethyl ethylenebis(thionocarbamate) was obtained. The same compound is obtained by condensing ethyl xanthogen thioanhydride

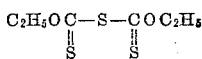

with ethylene diamine. Another method which is perhaps more convenient than either of the foregoing is to treat the condensation product of a xanthate and chloroacetic acid with an alkylene diamine. This method is illustrated in detail below:

Example 1

189 grams or substantially 2 moles of chloroacetic acid was dissolved in enough 20% sodium carbonate solution to give a pH of about 8. This solution was poured over 320.6 grams or substantially 2 moles of potassium ethyl xanthate. An exothermic reaction set in immediately and reaction was effected at 40–50° C. The reaction mixture was then cooled to 20° C. by means of an ice bath and 60.1 grams of ethylene diamine added thereto. The mass was stirred vigorously. After about 15 minutes the reaction mixture was too thick to stir readily so 300 ml. of water was added and stirring continued for about an hour. The product was collected by filtration and dried at 50° C. The yield of diethyl-N,N'-ethylenebis(thionocarbamate) was 139 grams, M.P. 108–110° C. The product contained 11.64% nitrogen and 26.96% sulfur as compared to calculated values of 11.89% nitrogen and 27.13% sulfur. The compound is very soluble in acetone, ethyl acetate and chloroform.

Example 2

94.5 grams (1.0 mole) of chloroacetic acid was dissolved in 290 grams of 20% aqueous sodium carbonate to give a solution of pH 8. To this solution was added with stirring 169 grams (1.0 mole) of potassium ethyl xanthate and stirring continued until solution was complete. The temperature rose during the addition to a maximum of 55° C. The filtered solution was allowed to stand over night and then to it was added with stirring 37.1 grams (0.5 mole) of 1,3-propane diamine. The temperature rose to a maximum of 52° C. and a viscous, upper oily layer formed. After cooling to room temperature the oil was separated, taken up in 200 ml. of benzene and washed neutral with water. The solvent was removed at 100°/5 mm. and diethyl trimethylenebis-(thionocarbamate) remained as an amber syrup. The yield was 107 grams or 85.5% of theory. Analysis gave 11.03% nitrogen and 25.35% sulfur as compared to 11.19% nitrogen and 25.65% sulfur calculated for $C_9H_{18}N_2O_2S_2$.

Further examples of the new compounds comprise dimethyl-N,N'-ethylenebis(thionocarbamate), dibutyl-N,N'-ethylenebis(thionocarbamate), dimethyl-N,N'-propylene-bis(thionocarbamate) and diallyl-N,N'-ethylenebis(thionocarbamate).

The new compounds of this invention are valuable defoliants. Applied at the rate of 16 to 24 pounds per acre, diethyl ethylenebis(thionocarbamate) and diethyl trimethylenebis(thionocarbamate) were very effective defoliants for soya beans. The compounds are also efficient cotton defoliants. Defoliating action is obtained by application in the form of a spray containing 1% or less of the thionocarbamate. Additionally, the compounds are pre-emergent herbicides applied at 25 pounds per acre. However, negative results were obtained where two thiocarbamyl radicals were attached to the same carbon atom or were separated by as many as six carbon atoms. Thus, the following compounds were not defoliants: diethyl isopentylidenebis(thionocarbamate); diethyl hexamethylenebis(thionocarbamate) and diethyl 1,4-piperazinedicarbodithionate. The ester radical is also significant as evidenced by the fact that bis[2-(2-hydroxy-ethoxy)ethyl]ethylenebis(thionocarbamate) was not a defoliant.

It is intended to cover all changes and modifications of the examples of the invention herein chosen for purposes of disclosure which do not constitute departures from the spirit and scope of the invention.

This application is a continuation-in-part of application Serial No. 412,398, filed February 24, 1954, now U.S. Patent 2,852,361.

What is claimed is:

1. A chemical compound of the structural formula

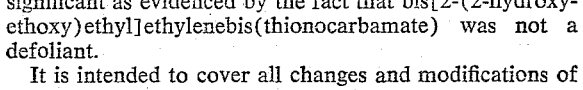

where R is a lower acyclic hydrocarbon radical the hydrogen of which is not less than one less than twice the number of carbon atoms and R' is an alkylene radical containing at least two but not more than three carbon atoms.

2. An alkylenebisthionocarbamate having the formula

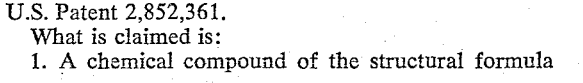

wherein R represents a lower alkyl radical containing from 1 to 4 carbon atoms, inclusive, and $R^1$ is an alkylene radical of 2 to 3 carbon atoms.

3. A chemical compound of the structural formula

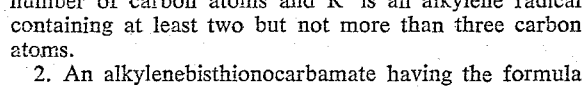

4. A chemical compound of the structural formula $$C_2H_5O\overset{S}{\overset{\|}{C}}-\overset{H}{N}-CH_2CH_2CH_2-\overset{H}{N}-\overset{S}{\overset{\|}{C}}OC_2H_5$$

References Cited in the file of this patent

UNITED STATES PATENTS 2,852,361    Lesslie ---------------- Sept. 16, 1958

OTHER REFERENCES

U.S. Department of Agriculture, Agricultural Research Administration, Bureau of Plant Industry, Soils and Agricultural Engineering. H.T. and S. Office Report No. 292, "Fungicidal Screening Tests for the Control of Decay in Florida Oranges," Winston et al., pages 1 and 11 relied on. June 1, 1953; Orlando, Florida.